United States Patent
Geddes et al.

[11] Patent Number: 5,777,049
[45] Date of Patent: Jul. 7, 1998

[54] POLYMERISATION PROCESSES AND REACTORS

[76] Inventors: Kenneth Raymond Geddes, 4 Denbigh Drive, Clitheroe BB2 2BH, United Kingdom; Mohammed Bashair Khan, 155 Henthorn Road, Clitheroe BB7 2QF, United Kingdom

[21] Appl. No.: 421,154

[22] Filed: Apr. 10, 1995

Related U.S. Application Data

[63] Continuation of Ser. No. 243,431, May 16, 1994, which is a continuation of Ser. No. 905,213, Jun. 29, 1992, abandoned, which is a continuation of Ser. No. 556,469, Jul. 24, 1990, abandoned.

[30] Foreign Application Priority Data

Aug. 8, 1989 [GB] United Kingdom ............... 8918131
Nov. 9, 1989 [GB] United Kingdom ............... 8925375

[51] Int. Cl.$^6$ ............... C08F 2/18
[52] U.S. Cl. ............... 526/64
[58] Field of Search ............... 526/64

[56] References Cited

U.S. PATENT DOCUMENTS 5,455,314  10/1995  Burns et al. ............... 526/64

*Primary Examiner*—Thomas R. Weber
*Attorney, Agent, or Firm*—William R. Hinds

[57] ABSTRACT

A loop polymerization process or apparatus primarily for vinyl and related monomers in aqueous suspension. The monomers and water are pumped into four rectangular passageway loops (10) operated at a sheer rate above 800 s$^{-1}$ while sustaining laminar flow. The polymer is removed from the passageway loops (10) at a T connector (16).

4 Claims, 1 Drawing Sheet

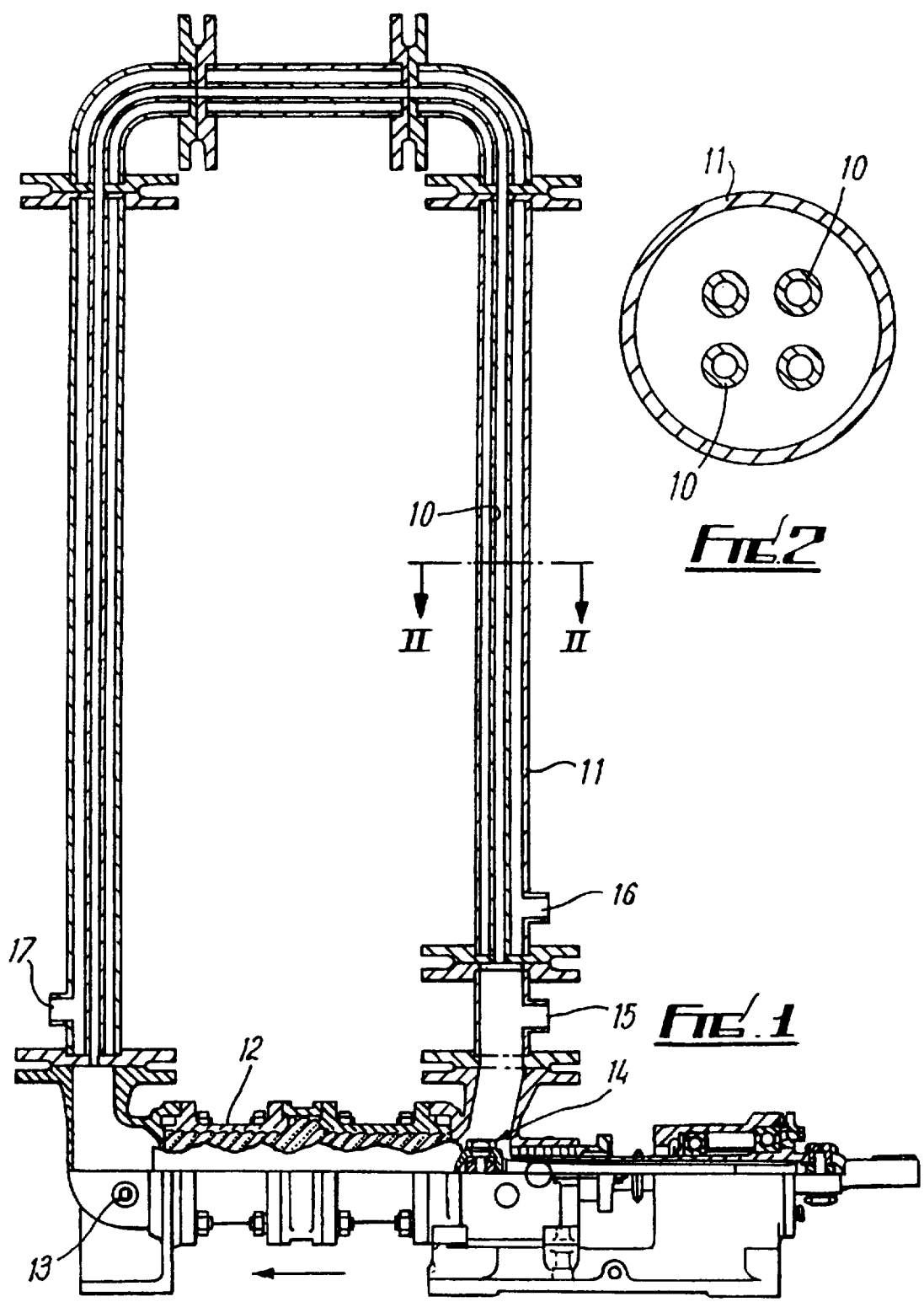

POLYMERISATION PROCESSES AND REACTORS

This is a continuation of application Ser. No. 08/243,431 filed May 16, 1994, which is a continuation of Ser. No. 07/905,213 filed Jun. 29, 1992, now abandoned, which is a continuation of Ser. No. 07/556,469 filed Jul. 24, 1990, now abandoned.

This invention relates to a new and improved arrangement for the polymerisation of vinyl and related monomers, especially in aqueous suspension, but also polymerisation in any medium in which the resulting polymer is insoluble Vinyl and related monomers include vinyl esters, the acrylate and methacrylate esters and the free acids, styrene, ethylene and related compounds which will copolymerise by free radical addition with these materials.

Polymerisation in reactors of vinyl monomers in aqueous suspension, either to form stable products known variously as emulsion polymers, latexes or dispersions; or in the form of discrete particles which can be readily separated by filtration, freezing, centrifuging, precipitation or other means to give solid polymer in powder or other forms, is a well established process. Substantial volumes of vinyl polymer are being manufactured currently in aqueous suspension. Further, it is an objective in many areas of process research to develop continuous processes. Such processes (and in particular "Loop Processes") have many attractions as already indicated in published patent documents such as EP-A2-0145325; GB-A-1124600 GB-A-1220777 and CA-A-985844.

The present invention seeks to further the progress of polymerisation using loop processes and reactors by operation of such processes and reactors at enhanced shear rates.

Advantages (which are shown by comparative examples below) arising from the invention are seen in products having finer particle size; higher and more consistent viscosity; better film quality in both casting and drying; and low polymerisation grit. These advantages can be obtained alongside large increases in output for a given reactor flow cross-section, higher non-volatiles and more consistent pH and surface tension.

The present invention provides a loop polymerisation process and apparatus characterised in that the loop has a multi-passageway flow path operated at a shear above 800 $s^{-1}$ whilst sustaining laminar flow in the flow path.

A reactor for use with the invention is now described with reference to the accompanying drawing in which:

BRIEF DESCRIPTION OF DRAWINGS

FIG. 1. is a diagrammatic sectional elevation; and FIG. 2 is a true enlarged cross-section on the line II—II of FIG. 1.

The reactor has a flowpath defined by four passageway loops 10 each constructed of 12.7 mm diameter pipe encased in a water jacket 11 of 75 mm diameter. The pipes of the loops 10 are arranged in a rectangular configuration on 25 mm×30 mm centres. The outer of the four loops is slightly longer (about 2.5%) than the inner. The average length of the loops is 3570 mm. Reactants in the flow path are circulated by a positive displacement pump 12 having a variable speed drive and powered by a 2237 watt electric motor. Reactants are supplied to the flowpath by hydraulically operated diaphragm metering pumps as follows:

Monomer in:

(Stream 1 in Examples below): at connector 13 at the outlet of pump 12

Water Phase in: (Stream 2 in Examples below): at connector 14 at the inlet of pump 12

Product cut: at T-connector 15

Cooling Water in and out: at T-connectors 16 and 17 respectively.

EXAMPLE 1

This illustrates the preparation of an acrylic copolymer emulsion.

|  |  | Parts |
|---|---|---|
| Stream 1 | Ethyl acrylate | 38.46 |
| (Monomer | Butyl acrylate | 4.00 |
| pre-emulsion) | Methyl methacrylate | 6.00 |
|  | Methacrylic acid | 1.50 |
|  | Diallyl phthalate | 0.25 |
|  | 1 - Dodecane thiol | 0.05 |
|  | Non-ionic surfactant | 3.12 |
|  | Sodium vinyl sulphonate | 1.00 |
|  | Ammonium persulphate | 0.20 |
|  | t-Butyl hydroperoxide | 0.20 |
|  | Water | 21.86 |
| Stream 2 | Non-ionic surfactant | 0.40 |
|  | Sodium metabisulphite | 0.40 |
|  | Water | 22.08 |
| Post-catalyst | t-Butyl hydroperoxide | 0.08 |
|  | Water | 0.40 |
|  | Total | 100.00 |

Process

The reactor was filled with a compatible emulsion polymer from a previous run. Stream 2 was started at a pumping rate of 110 mls/minute and simultaneously the circulation started.

The internal loop system pressure was increased to 50 psig against a counter-balanced diaphragm valve on the outlet piping from Connector 15. The temperature was raised to 55° C. with the brief application of steam into the jacket 11. Pumping of Stream 1, the monomer pre-emulsion then commenced. After a period of equilibriation, during which time the product was discarded, a sample was taken for analysis, adding the post catalyst and continuing to stir for a cooling period of about two hours.

Process parameters were summarised as follows:

| Reaction Temperature: | 55° C. |
|---|---|
| Reaction Pressure: | 50 psig |
| Production rate: | 500 mls/minute |
| Recycle-to-feed ratio | 172 |
| Mean residence time: | 9.6 minutes |
| Flowpath velocity (mean): | 280 cm/sec. |
| Flowpath shear rate (mean): | 2240 $s^{-1}$ |
| Product properties were as follows:- | |
| Theoretical non-volatiles: | 55.6% |
| Actual non-volatiles: | 55.4% |
| Viscosity: | |
| Haake MV1, 13$s^{-1}$ | 0.16 pas.sec |
| Haake MV1, 53$s^{-1}$ | 0.08 pas.sec |
| pH | 2.16 |
| Surface Tension | 43.0 dynes/cm |
| Particles size (average) | 230 nm |
| Dry Film quality | Clear and glossy |

EXAMPLE 2

This example used the same equipment and process as described in Example 1 and the same formulation.

The only significant change was an increase in the production rate (i.e. reduced residence time)

Process parameters were as follows:

| | |
|---|---|
| Reaction temperature: | 55° C. |
| Reaction pressure: | 50 psig |
| Production rate: | 700 mls/minute |
| Recycle-to-feed ratio | 122 |
| Mean Residence time: | 6.8 minutes |
| Flowpath velocity (mean) | 280 cm/sec |
| Flowpath shear rate (mean) | 2240 s$^{-1}$ |
| Process properties were as follows:- | |
| Thoretical non-volatiles: | 55.6% |
| Actual non-volatiles: | 55.3% |
| Viscosity: | |
| Haake MV1, 14s$^{-1}$ | 0.16 pas.sec |
| Haake MV1, 53s$^{-1}$ | 0.07 pas.sec |
| pH | 2.20 |
| Surface Tension | 43.0 dynes/cm |
| Particle size (average) | 210 nm |
| Dry film quality | Clear and glossy |

COMPARATIVE EXAMPLE 3

For comparison purposes a similar formulation was run an a single passageway Loop Reactor using a 2.54 cm stainless steel loop pipe. i. e. having the same total cross-section of pipe as the 4-passageway reactor used in Examples 1 and 2.

The process was generally similar, except that the production rate to yield a satisfactory conversion was set at 100 mls/minute.

Process parameters were as follows:

| | |
|---|---|
| Reaction temperature | 55° C. |
| Reaction pressure: | 50 psig |
| Production rate: | 100 mls/minute |
| Recycle-to-feed: | 245 |
| Mean residence time: | 26 minutes |
| Flowpath velocity (mean): | 81 cm/sec |
| Flowpath shear rate: | 79s$^{-1}$ |

Product properties were as follows:

| | |
|---|---|
| Theoretical non-volatiles: | 54.8% |
| Actual non-volatiles: | 54.9% |
| Viscosity: | |
| Haake MV1, 13s$^-$ | 0.13 pas.sec |
| Haake MV1, 53s$^{-1}$ | 0.08 pas.sec |
| pH: | 2.01 |
| Surface Tension: | 44.0 dynes/cm |
| Particle size (average): | 300 nm |
| Dry Film quality | Clear and glossy |

It can be seen that the products of this invention are superior to the comparative example of the prior art in a number of ways. They are significantly finer in particle size, slightly higher in viscosity and give better film quality on casting a film and drying. These improved properties could not have been foreseen from the very large increase in the rate of production found possible (five-fold in the case of Example 1 and seven-fold in the case of Example 2) using the same total cross-section of reactor passageway.

EXAMPLES 4–12

These Examples illustrate the production of a styrene-acrylic copolymer emulsion and the consistancy of the results.

The equipment was the same 4-passageway reactor used in Examples 1 and 2 and the process was similar.

The formulation employed in all examples was as follows:

| | Parts |
|---|---|
| Stream 1 -(Monomer Pre-emulsion) | |
| Styrene monomer | 20.74 |
| Butyl acrylate monomer | 27.28 |
| Methacrylic acid monomer | 1.02 |
| Sodium vinyl sulphonate | 0.51 |
| 1-Dodecane thiol | 0.05 |
| Ammonium persulphate | 0.25 |
| Potassium persulphate | 0.25 |
| Anionic surfactant (30% active) | 10.22 |
| Water | 15.33 |
| Stream 2 | |
| Non-ionic Surfactant | 1.02 |
| Sodium metabisulphate | 0.77 |
| Water | 22.48 |
| Post-Catalyst | |
| t-Butyl hydroperoxide | 0.08 |
| | 100.00 |

Process parameters for the Examples were as follows:

| | Example | | | | | | | | |
|---|---|---|---|---|---|---|---|---|---|
| | 4 | 5 | 6 | 7 | 8 | 9 | 10 | 11 | 12 |
| Reaction temperature (°C.) | 55 | 55 | 55 | 55 | 55 | 55 | 55 | 55 | 55 |
| Reaction pressure (psig) | 20 | 20 | 20 | 20 | 30 | 50 | 40 | 50 | 40 |
| Production rate (mls/minute) | 273 | 459 | 459 | 459 | 459 | 459 | 459 | 459 | 459 |
| Recycle-to-feed ratio | 314 | 187 | 187 | 187 | 187 | 187 | 187 | 187 | 187 |
| Mean residence time (mins) | 17.6 | 10.5 | 10.5 | 10.5 | 10.5 | 10.5 | 10.5 | 10.5 | 10.5 |
| Flow path velocity (mean) (cm/sec) | 280 | 280 | 280 | 280 | 280 | 280 | 280 | 280 | 280 |
| Flow path shear rate (mean) (s$^{-1}$) | 2220 | 2220 | 2220 | 2220 | 2220 | 2220 | 2220 | 2220 | 2220 |

|  | Example: | | | | | | | | |
|---|---|---|---|---|---|---|---|---|---|
|  | 4 | 5 | 6 | 7 | 8 | 9 | 10 | 11 | 12 |
| Actual non-volatile (%) | 54.0 | 54.0 | 54.0 | 53.8 | 53.8 | 53.8 | 53.6 | 53.6 | 53.6 |
| Viscosity, Haake MV1 13 $s^{-1}$ (pas · sec) | 1.09 | 1.09 | 1.09 | 0.97 | 0.97 | 0.97 | 1.00 | 1.00 | 10.0 |
| pH | 1.84 | 1.84 | 1.84 | 1.77 | 1.77 | 1.77 | 1.85 | 1.85 | 1.85 |
| Surface tension(dynes/cm) | 47.5 | 47.5 | 47.5 | 44.0 | 44.0 | 44.0 | 45.0 | 45.0 | 45.0 |
| Particle size (average) (nm) | 110 | 110 | 110 | 120 | 120 | 120 | 70 | 70 | 70 |
| Dry Film Quality |  |  |  | clear glossy, few bits | | | | | |

For the series of nine examples of the four-passageway reactor in accordance with the invention.
Non-volatiles averaged: (±2σ): 53.8 ± 0.3%
Viscosity (13 $s^{-1}$) averaged: 1.01 ± 0.12 pas · sec
ph averaged: 1.8 ± 0.07
Surface tension averaged: 45.5 ± 2.9 d/cm
Particle size averaged: 100 ± 46 nm

COMPARATIVE EXAMPLES 13–21

These Examples, using a single passageway loop reactor according to that used in Example 3.

Process parameters were as follows:

| Comparative Prior Art Example: | 13–16 | 17 | 18–20 | 21 |
|---|---|---|---|---|
| Reaction temperature (°C.) | 55 | 55 | 55 | 55 |
| Reaction pressure (psig) | 50 | 50 | 40 | 20 |
| Production rate (mls/minute) | 91 | 91 | 91 | 80 |
| Recycle-to-feed ratio | 270 | 270 | 270 | 308 |
| Mean residence time (minutes) | 28.6 | 28.6 | 28.6 | 32.5 |
| Flow path velocity (mean)(cm/sec) | 81 | 81 | 81 | 81 |
| Flow path shear rate ($s^{-1}$) | 319 | 319 | 319 | 80 |

(v) Particle sizes from products of this invention averaged lower, although in this case there was less consistency in results from the invention compared to the prior art.

In summary, a significant unforeseeable improvement in product quality was demonstrated using the process of this invention compared to the prior art. The rate of production with the invention was also five times greater for the given equal flowpath cross-sectional areas.

EXAMPLES 22–25

These examples show the use of the process or this invention in the production of a Vinyl Acetate Copolymer.

The equipment was again the same as used previously in Examples 1-2 and 4–12.

|  | Comparative Prior-Art Example: | | | | | | | | |
|---|---|---|---|---|---|---|---|---|---|
|  | 13 | 14 | 15 | 16 | 17 | 18 | 19 | 20 | 21 |
| Actual non-volatiles (%) | 54.0 | 55.5 | 53.6 | 51.5 | 52.9 | 55.5 | 53.3 | 54.0 | 53.3 |
| Viscosity, Haake MV1, 13 $s^{-1}$ pas · sec | 0.78 | 0.80 | 0.77 | 0.87 | 0.65 | 1.10 | 0.29 | 1.00 | 0.29 |
| pH | 1.71 | 1.77 | 1.72 | 1.77 | 1.91 | 1.68 | 2.0 | 1.71 | 2.0 |
| Surface tension (dynes/cm) | 43.5 | 44.5 | 43.5 | 44.5 | 42.0 | 51.0 | 44.5 | 49.5 | 44.5 |
| Particle size (average) (nm) | 120 | 120 | 120 | 110 | 120 | 120 | 110 | 90 | 110 |
| Dry Film quality |  |  |  | Clear and glossy | | | | | |

For the series of nine examples of the single passageway reactor (ie. in accordance with the prior art).
Non-volatiles averaged: (±2σ): 53.7 ± 2.4%
Viscosity (13 $s^{-1}$) averaged: 0.73 ± 0.53 pas · sec
ph averaged: 1.8 ± 0.24
Surface tension averaged: 45.3 ± 5.6 dynes/cm
Particle size averaged: 113 ± 19 nm By a comparison of the average product properties of Examples 4 to 12 (the invention) with Examples 13–21 (the art) it can be immediately seen that:

(i) Non-volatiles, using the process of this invention, were marginally higher, showing better conversion. They were also far more consistent.

(ii) Viscosity using the process of this invention was significantly higher and more consistent, especially when the percentage variability on average viscosity is considered in known processes.

(iii) pH's were similar, although those of the invention were more consistent.

(iv) Surface tension was similar although again products from this invention showed more consistency.

|  | Parts Examples 24–27 |
|---|---|
| Stream 1 (Monomer and initiator) | |
| Vinyl Acetate Monomer | 41.46 |
| Veova (TM:Shell) 10 Monomer | 10.36 |
| t-Butyl Hydroperoxide | 0.22 |
| Stream 2 | |
| Hydroxyethyl Cellulose | 1.38 |
| Non-ionic Surfactant (30% Active) | 2.96 |
| Sodium Acetate (Anfydrous) | 0.16 |

|  | Parts<br>Examples 24–27 |
|---|---|
| Sodium Metabisulphite | 0.22 |
| Water | 43.24 |
|  | 100.00 |

Process parameters were as follows:

| Example | 22 | 23 | 24 | 25 |
|---|---|---|---|---|
| Reaction temperature (°C.) | 60 | 55 | 55 | 55 |
| Reaction pressure (psig) | 15 | 15 | 15 | 50 |
| Production rate (mls/minute) | 2000 | 1600 | 1200 | 600 |
| Recycle-to-feed ratio | 49 | 51 | 51 | 61 |
| Mean residence time (minute) | 2.4 | 3 | 4 | 8 |
| Flowpath velocity (mean) (cm/sec) | 325 | 325 | 290 | 240 |
| Flowpath shear rate (mean) ($s^{-1}$) | 2540 | 2110 | 1590 | 950 |

Theoretical non-volatiles for all examples were 54.5%. Other properties were as follows:

| Example | 22 | 23 | 24 | 25 | Av. |
|---|---|---|---|---|---|
| Actual non-volatiles | 54.1 | 55.4 | 53.9 | 53.0 | 54.1 |
| Viscosity, Haake MV1, 5.1 $s^{-1}$ pas.sec | 4.85 | 9.70 | 2.13 | 1.40 | 4.52 |
| pH | 4.7 | 4.8 | 4.8 | 4.8 | 4.8 |
| Average particle size (nm) | 860 | 1000 | 770 | 840 | 868 |
| Polymerisation grit (ppm) | 20 | 340 | 20 | 0 | 95 |

COMPARATIVE EXAMPLES 26–29

Four runs, using the single passageway reactor employed for comparative Examples 13–21, were analysed for comparison purposes.

The formulations of the two streams of materials fed into the reactor were the same as those given for Examples 22–25, and the reaction temperatures chosen to be similar—so that product properties could be directly compared.

Process parameters were as follows:

| Comparative Prior Art Example | 26 | 27 | 28 | 29 |
|---|---|---|---|---|
| Reaction temperature (°C.) | 60 | 55 | 55 | 55 |
| Reaction pressure (psig) | 50 | 50 | 50 | 50 |
| Production rate (mls/minute) | 260 | 260 | 260 | 260 |
| Recycle-to-feed ratio | 66 | 66 | 66 | 66 |
| Mean residence time (minutes) | 10 | 10 | 10 | 10 |
| Flowpath velocity (mean)(cm/sec) | 57 | 57 | 57 | 57 |
| Flowpath shear rate (mean)($s^{-1}$) | 50.5 | 50.5 | 50.5 | 50.5 |

Theoretical non-volatiles for all four comparative examples was 54.5%. Physical properties of the products were found to be as follows:

| Comparative Prior Art Example | 26 | 29 | 38 | 29 | Av. |
|---|---|---|---|---|---|
| Actual non-volatiles (%) | 54.3 | 54.5 | 54.9 | 55.0 | 54.7 |
| Viscosity, Haake, 13 $s^{-1}$ (pas.sec) | 0.61 | 0.64 | 0.84 | 1.06 | 0.84 |
| pH | 4.9 | 4.8 | 4.8 | 5.0 | 4.9 |
| Average particle size (nm) | 920 | 890 | 900 | 920 | 908 |
| Polymerisation grit (ppm) | 25 | 880 | 280 | 20 | 301 |

The increase in viscosity afforded by the invention allows the use of less of the expensive colloid stabiliser and thickener, hydroxy ethyl cellulose, with significant economic advantages. Reduced polymerisation grit also gives economic advantages, both from the greater yield of useful material obtained and the increased speed of processing. Also the finer particle sizes afforded by the invention give greater gloss (where this is required). Where gloss is not required, a reduction in anionic surfactant or a change in other process parameters may give economic or processing advantages.

Again, it was concluded that the invention was capable of manufacturing from 2 to 7.7 times the volume of production compared to a reactor of the prior art, having an equivalent flowpath cross-section, but unexpected improvements to product quality were also found which could not have been predicted.

In modifications to the design of the reactor shown in the drawings, the passageways could be included an elongate mono-block structure. The passageways could vary in cross-section or mutual orientation such as to act as a static mixer or equalise performance with each other.

We claim:

1. In a process for the polymerisation of vinyl and related monomers in a medium in which the resulting polymer is insoluble, the process being a continuous loop process in which reagents are continuously fed to a loop and caused to flow continuously around the loop to react, and reacted product and possibly some not fully reacted product are continuously withdrawn from the loop, the flow path in the loop being open throughout the full loop such as to permit circulation and recirculation of reagents, the improvement wherein the flow path employs multiple parallel flow paths over substantially all of the loop length to enable enhanced shear while sustaining laminar flow, the flow paths in the loop and the operation of the loop being such that the shear rate is in excess of 800 $s^{-1}$ while the flow is maintained as laminar.

2. A process as claimed in claim 1 wherein the shear rate is in the range of 1000–3000 $s^{-1}$.

3. A process as claimed in claim 1 wherein the process is polymerisation in aqueous suspension.

4. A process as claimed in claim 1 wherein the multiple parallel flow paths are defined by a plurality of generally parallel pipes encased over part of their length in a water jacket and communicating at pipe ends with a positive displacement pump for circulating and recirculating reactants through the pipes and around the loop at said shear rate while maintaining the flow as laminar, said pump being connected so as to complete said loop.

* * * * *